United States Patent
Case

[11] 3,922,961
[45] Dec. 2, 1975

[54] ROTARY COOKING DEVICE

[76] Inventor: Arol L. Case, 5311 Zadell Ave., Temple City, Calif. 91780

[22] Filed: Feb. 4, 1974

[21] Appl. No.: 439,297

[52] U.S. Cl. ............................... 99/427; 99/450
[51] Int. Cl.² .................. A47J 37/04; A47J 37/07
[58] Field of Search .......... 99/427, 426, 421 P, 449, 99/450

[56] References Cited
UNITED STATES PATENTS

| | | | |
|---|---|---|---|
| 1,359,749 | 11/1920 | Schey | 99/427 |
| 3,163,103 | 12/1964 | Shoup | 99/427 |
| 3,285,160 | 11/1966 | Smith | 99/427 |

FOREIGN PATENTS OR APPLICATIONS

| | | | |
|---|---|---|---|
| 921,957 | 3/1963 | United Kingdom | 99/427 |

*Primary Examiner*—Harvey C. Hornsby
*Assistant Examiner*—Arthur O. Henderson
*Attorney, Agent, or Firm*—William P. Green

[57] ABSTRACT

A rotary cooking device having two separate hub elements to be mounted for rotation about a common axis and adjustably carrying two grill parts for engaging opposite sides of a roast or other piece of meat to clamp the meat between the grills, with each hub element being connected to each grill by a pair of elongated members projecting radially outwardly from the hub element in generally parallel and spaced relation, and through guideways formed in the connected grill, and with a nut or other fastener being connected onto one of the members to tighten the grill radially inwardly, while the other member by virtue of its interfitting relation with the grill coacts with the first member in maintaining the parts in a predetermined essentially rigid orientation without the necessity for other direct interconnection of the two opposite end hub elements.

10 Claims, 8 Drawing Figures

U.S. Patent Dec. 2, 1975 3,922,961
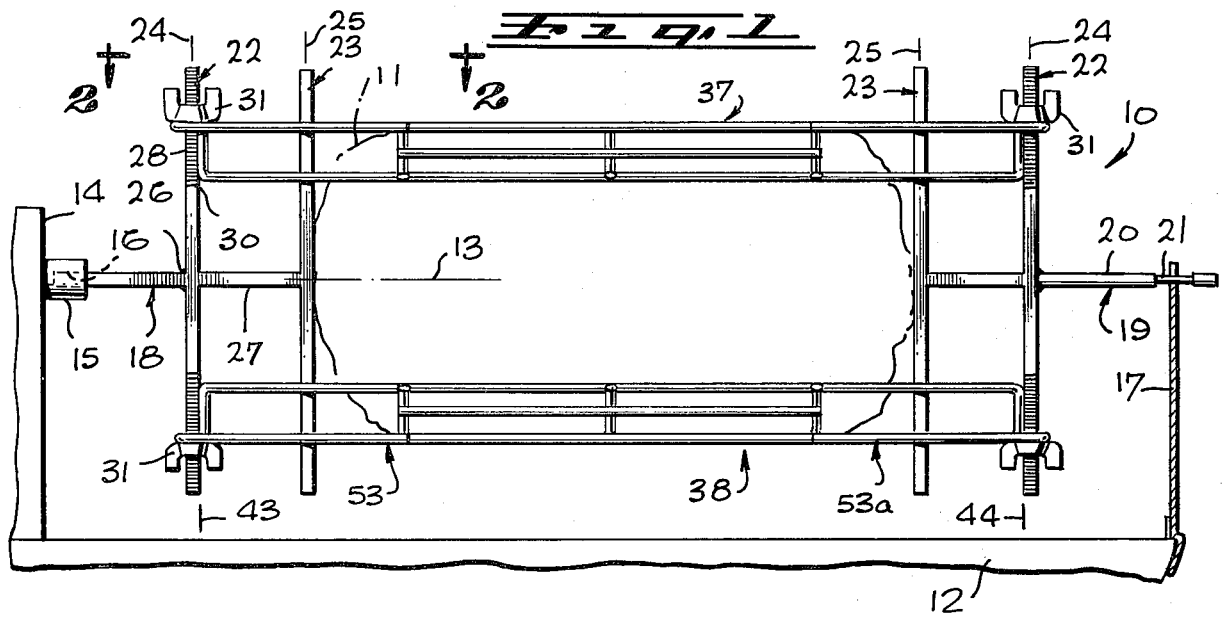
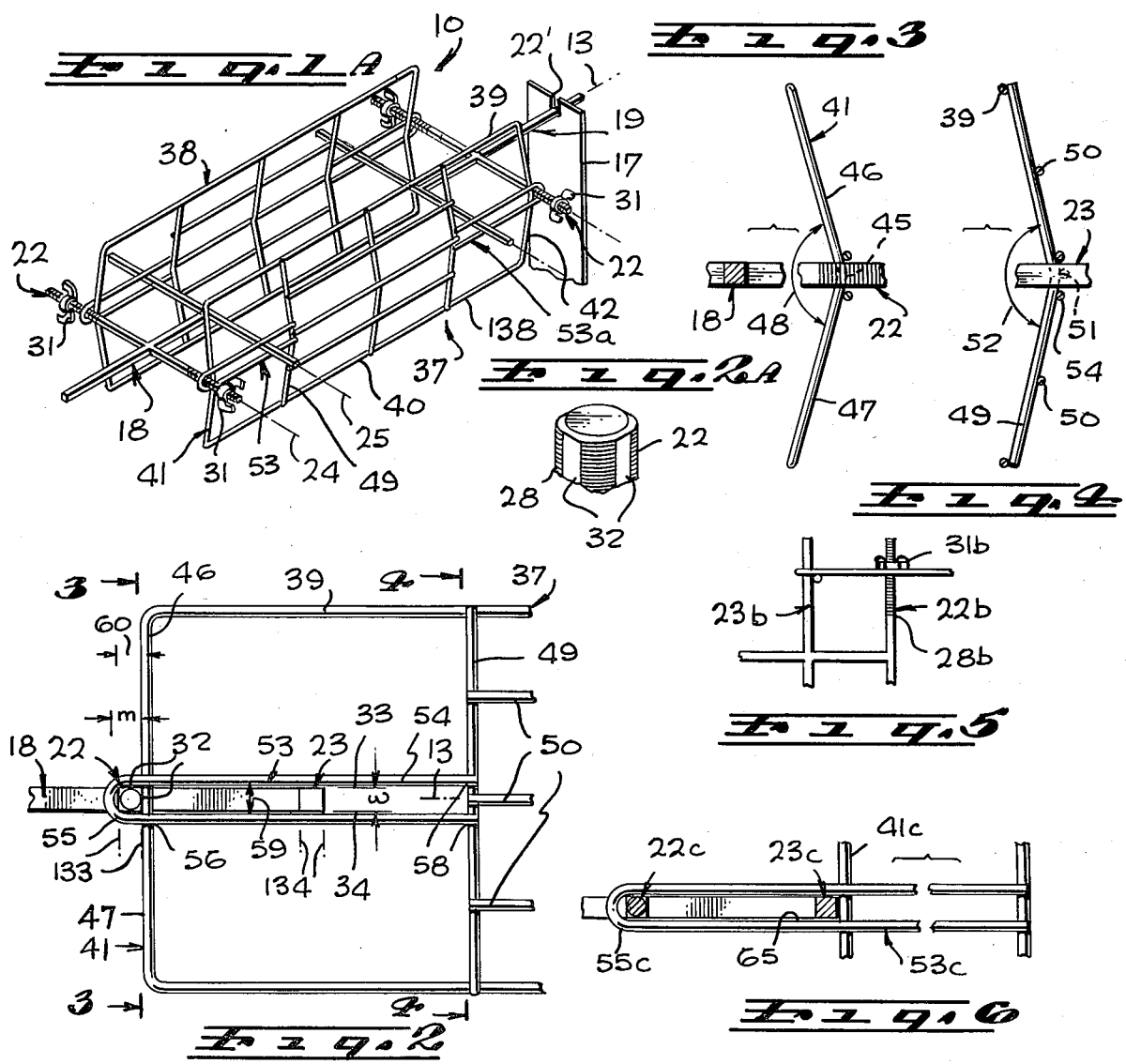

ROTARY COOKING DEVICE

BACKGROUND OF THE INVENTION

This invention relates to improved rotary cooking devices for holding and turning a roast or other piece of meat while it is being cooked.

Various types of barbecuing equipment have been developed in the past for holding a rotating piece of meat. Some of these require a spit to be forced entirely through the center of the meat, with the meat then being held against rotation by tightening of sharpened pins against its opposite ends. With this type of equipment, it is often very difficult to properly center the meat on the spit, and balance it in a manner enabling its rotation at an even rate and by the usual motor of relatively low power which is ordinarily supplied in such barbecuing equipment. In other previously proposed expedients, meat holding structures have been utilized which have avoided the necessity for thus forcing a spit through the center of the meat, and which instead have employed grill or rack elements which engage the outer surface of the meat in a relation holding it in proper position. However, all of the units of this type with which I am familiar have been relatively bulky, cumbersome, and inconvenient to use, and have usually required provision of a rather heavy rigid frame structure in order to maintain the device sufficiently rigid to properly hold and locate a piece of meat of substantial size and weight, such as a large roast, turkey, or the like.

SUMMARY OF THE INVENTION

The present invention relates to an improved meat-holding unit of the second general type discussed above, but in which greater structural simplicity is attained while at the same time maintaining adequate overall rigidity of the assembly positively holding the meat in an accurately centered and balanced position with respect to the rotary axis of the device. These results are achieved by means of a unique interfitting relationship between two separately formed and otherwise unconnected end hub elements and a pair of relatively adjustable grill parts, in a manner enabling the grills themselves to maintain the hubs in a proper relative orientation and axially aligned condition. More particularly, the connections between the hub members and grills include pairs of elongated members which extend generally radially with respect to the axis of rotation of the device in essentially parallel relation and are slidably received in coacting guideways, with one of the elongated members carrying a fastener, such as a nut, adjustable therealong to tighten the grill radially inwardly, while the other elongated member coacts with the first to maintain the desired relative orientation of the hub and grill structures. Preferably, each hub member carries two such pairs of elongated members projecting therefrom in diametrically opposite directions and receivable within guideways formed in two different separately formed grill structures respectively.

BRIEF DESCRIPTION OF THE DRAWING

The above and other features and objects of the invention will be better understood from the following detailed description of the typical embodiments illustrated in the accompanying drawing in which:

FIG. 1 is a side view of a preferred form of rotary cooking device constructed in accordance with the invention;

FIG. 1A is a perspective view of the device;

FIG. 2 is a fragmentary plan view taken on line 2—2 of FIG. 1;

FIG. 2A is a fragmentary perspective representation of one of the square cross section threaded grill mounting members;

FIG. 3 is a fragmentary transverse section taken on line 3—3 of FIG. 2;

FIG. 4 is a fragmentary transverse section taken on line 4—4 of FIG. 2;

FIG. 5 is a view corresponding to a portion of FIG. 1, but showing a variational form of the invention; and FIG. 6 is a view corresponding to a portion of FIG. 2, but showing another variational arrangement.

DESCRIPTION OF THE PREFERRED EMBODIMENTS

Referring first to FIGS. 1 through 4, and particularly to FIG. 1, there is shown at 10 a rotary device for holding a roast or other piece of meat 11 while it is being cooked by heat from an appropriate source, such as charcoal burning within a barbecue brazier 12. The meat holder 10 is slowly turned about a horizontal axis 13 by a motor 14 having a drive socket 15 containing a noncircular drive recess 16 of preferably square cross section centered and turning about axis 16. The motor may be mounted stationarily to a first side of the brazier, while an upstanding bearing bracket 17 is connected to and projects upwardly from the opposite side of the brazier in fixed position to rotatably mount the opposite end of meat holder 10.

The device 10 includes two hub elements 18 and 19, which preferably form or act as two aligned stub shafts extending along axis 13 and projecting in opposite axial directions for engagement with socket 15 and bearing bracket 17 respectively. As seen in FIG. 3, the shaft or hub element 18 is desirably of square cross section along its entire length, in correspondence with the square cross section of socket recess 16 within rotary drive part 15, to be positively driven thereby about axis 13. The second stub shaft 19 may be of circular cross section transversely of axis 13, typically having a cylindrical outer surface 20 extending along the major portion of its extent at a first diameter, except at the location of a reduced diameter cylindrical portion 21 which may be received within a notch 22 formed in bearing bracket 17, with that notch having a lower semicircular portion of a diameter corresponding approximately to the diameter of portion 21 of shaft 19 to effectively locate and journal the shaft for rotation about axis 13.

Each of the two stub shafts 18 and 19 carries two elongated parallel grill mounting members 22 and 23, extending along two axes 24 and 25 which extend perpendicular to and intersect main axis 13 and are spaced axially apart as shown. Each member 22 is rigidly connected at its longitudinal center to the associated stub shaft 18 or 19, as by brazing or welding at 26. The members 23 are in turn rigidly connected to members 22 by axially extending shaft members 27 which may be considered as forming in effect extensions of or portions of stub shafts 18 and 19, and which are rigidly brazed, welded, or otherwise secured to the centers of members 22 and 23 in the relation illustrated in FIG. 1.

The two members 22 have external threads 28 extending along most of their length from the radially outer extremities 29 of these members to locations 30 which are fairly close to the stub shafts 18 and 19. Connected onto the threads 28 of each member 22 are a pair of nuts 31, which may be wing nuts as shown for ease of manual actuation, and which are threadedly adjustable radially inwardly and outwardly along members 22. As seen in FIGS. 2 and 2A, the threads 28 of members 22 may be truncated along four sides 32, to form mutually aligned flats on those four sides giving to each member 22 a square cross section transversely of axis 24 and as viewed in FIG. 2. This result may be achieved easily and simply by merely forming members 22 from stock of initially square cross section, and then cutting threads on that square cross section material with a die or other tool of appropriate size.

Members 23 may be of the same length as members 22, and are preferably unthreaded and of square cross section corresponding to the cross section defined by the flats of members 22 at 32. As seen in FIG. 2, members 22 and 23 are so oriented that a first pair of sides of the square cross section of each member lie in two parallel planes 33 and 34 disposed parallel to and at opposite sides of axis 13, while the other sides of members 22 and 23 lie in parallel planes 133 and 134 disposed transversely of axis 13.

In addition to the two stub shafts and carried parts, the barbecuing device 10 includes two identical grills or racks 37 and 38, for engaging opposite sides of the piece of meat 11. These grills are desirably rigid and formed of an appropriate grillwork pattern capable of effectively embracing and holding the meat, while at the same time providing openings through the grillwork for exposing the meat directly to heat from the fire or other heat source. As seen in FIG. 1A, each grill may have an outer approximately rectangular peripheral member 138, formed of an appropriate rigid rod or wire material, shaped to form two parallel side members 39 and 40 extending parallel to axis 13, and two cross members 41 and 42 at opposite ends of the grill and lying in two transverse planes 43 and 44 respectively. With reference to FIG. 3, it is noted that the two identical end cross pieces 41 and 42 are preferably bent at their centers 45, so that each member 41 or 42 has two halves 46 and 47 disposed at an angle 48 with respect to one another, which angle is somewhat less than 180°, typically about 145°. At a number of locations axially intermediate the two end cross pieces 41 and 42, a number of additional cross pieces 49 may extend between the two side members 39 and 40, and be appropriately brazed or welded at opposite ends to said side members. These additional cross pieces 49 (preferably three in number as shown) may be formed of the same type of rigid rod material as is part 38, and may carry a number of axially extending parallel members 50, brazed or welded to the various elements 49 at their intersections with those members. As seen in FIG. 4, each of the cross pieces 49 may be bent at its center 51 in essential correspondence with the bend provided in the end cross pieces 41 and 42, the define an angle 52 corresponding approximately to angle 48 of the end cross pieces. Thus, all the cross pieces 41, 42 and 49 give to the overall grill a radially inwardly recessed configuration enabling the grill to receive a portion of the meat within the recess formed in a manner effectively confining the meat in fixed position by provision of only two diametrically opposite grills.

Extending between end cross piece 41 and the nearest of the elements 49, there is provided a U-shaped part 53, having two spaced parallel elongated legs 54 extending parallel to axis 13 and interconnected by a return bend portion 55 of the part 53 axially outwardly beyond cross piece 41. The legs 54 are rigidly brazed or welded to members 41 and 49 at 56 and 58. The lateral spacing 59 between the two legs 54 is just slightly greater than the width $w$ of members 22 and 23 between their opposite flat side surfaces, to confine members 22 and 23 between those legs 56. Also, the axial length $m$ of the opening formed between U-shaped return bend portion 55 of part 53 and cross piece 41 is just slightly greater than the axial width 60 of member 22, to form in effect an approximately square opening closely receiving and confining member 22 and thereby locating the grill relative to member 22.

At the opposite end of each grill, there is provided a second U-shaped rigid member 53a, which may be identical with the specifically described member 53 at the left end in FIG. 2, and is mounted in the same manner but reversely to cross piece 42 and the nearest cross piece 49.

In using the rotary device 10 of FIGS. 1 to 4, a person may first move the grills into interfitting relationship with members 22 and 23, as shown, but with the nuts 31 positioned relatively far out on members 22 to provide a very wide space between the two grills 37 and 38. The user may then place the roast or other piece of meat between the two grills, and then tighten the nuts 31 radially inwardly along the threaded portions of members 22 to gradually tighten the grills inwardly against the meat. All four of the nuts may be adjusted separately, until the two stub shafts 18 and 19 are properly aligned with one another, and the meat is accurately centered and balanced with respect to the axis, for rotation thereabout. The entire assembly is then supported at one end by motor driven socket 15 and at the other end by bearing support 17, so that upon energization of the motor the holder 10 and contained meat will gradually rotate during the cooking process.

The provision of the two members 23 on the two end assemblies, in addition to the threaded parts 22, enables the assembled device and contained meat to turn to different positions about axis 13 without permitting sagging of the structure between the two end stub shafts 18 and 19, and accomplishes this result without the requirement for any permanent rigid connection between the two stub shafts. This results because of the unique sliding reception of both of the members 22 and 23 of each end shaft assembly within guideways formed between the opposite side legs of members 53 and 53a. When the assembly is turned through 90° from the the position of FIG. 1, to a position in which members 22 and 23 extend horizontally rather than vertically, the engagement of members 23 with legs 54 of members 53 and 53a coacts with the reception of threaded members 22 within the guideways formed by the return bend portions of members 53 and 53a to hold the entire assembly in a position of axial rigidity. If the members 23 were not present when the assembly was turned to the discussed position 90° offset from the FIG. 1 position, there would be nothing to prevent the stub shaft assemblies from pivoting relative to the grills about the axes 24 of members 22, and under the weight of the carried meat, in a relation causing the entire assembly to droop and no longer be supported for rotation.

FIG. 5 shows fragmentarily a variational arrangement, corresponding to a portion of FIG. 1, but in which variation the members 22b and 23b, corresponding to members 22 and 23 of FIG. 1, are reversed in position, so that member 22b and its adjustably carried fasteners 31b are located axially inwardly of parts 23b rather than outwardly thereof. The FIG. 5 arrangement is also illustrated as differing from FIGS. 1 to 4 in another respect, specifically by substitution for nuts 31 of fasteners 31b which may be of the ratchet type, engaging transverse ratchet teeth 28b rather than threads on members 22b, and adapted to be easily slid axially inwardly along members 22b and to engage teeth 28b in a relation holding element 31b against radially outward movement from any set position. Any convenient type of release may be provided for these elements 31b to free them for radially outward movement along members 22b. Various other types of fasteners may of course be substituted for the nuts 31 if desired.

FIG. 6 corresponds to a portion of FIG. 2, but shows another variation in which the two members 22c and 23c, corresponding to parts 22 and 23 of FIG. 2, are both located axially outwardly beyond the end cross piece 41c corresponding to cross piece 41 of FIG. 2, so that both parts 22c and 23c are received and confined within a common axially elongated guideway 65 formed in the elongated return bend portion 55c of member 53c.

While certain specific embodiments of the present invention have been disclosed as typical, the invention is of course not limited to these particular forms, but rather is applicable broadly to all such variations as fall within the scope of the appended claims.

I claim:

1. A rotary cooking device comprising two opposite end hub structures adapted to be mounted at spaced locations for rotation about a common axis, and two grills to be located at opposite sides of said axis for engaging opposite sides of a piece of meat and connectible near opposite ends of said grills to said hub structures respectively and for generally radial adjustment relative thereto, each of said hub structures having a first pair of elongated members projecting radially outwardly from said axis in essentially diametrically opposite directions and slidably received in guideways formed in said two grills respectively to mount the grills for guided radial movement, fasteners connected to said two elongated members radially outwardly beyond said grills respectively and adjustable longitudinally of said members to clamp said grills against opposite sides of the meat in any of various different settings of the grills, and each of said hub structures including a second pair of elongated members projecting outwardly away from said axis in diametrically opposite directions and essentially parallel to but spaced axially from said first members respectively and slidably received within guideways in the grills to coact with the first pair of elongated members in maintaining a predetermined orientation of the grills with respect to the hub structures in different radial settings of the grills.

2. A rotary cooking device as recited in claim 1, in which said hub structures have stub shafts projecting in opposite directions therefrom for rotatably mounting the device and one of which is of noncircular cross section.

3. A rotary cooking device as recited in claim 1, in which each grill includes means forming two separate guideways for slidably receiving two elongated members of said two pairs respectively, one of said guideways being dimensioned to receive a corresponding one of said elongated members relatively closely and prevent substantial relative movement thereof either axially or transversely, the other of said guideways having a transverse width receiving a corresponding one of said elongated members relatively closely but having an elongated axial dimension greater than the axial dimension of said received member.

4. A rotary cooking device as recited in claim 3, in which at least one of said fasteners is a ratchet device engageable in holding relation with any of a series of different teeth formed at spaced locations along a corresponding one of said elongated members.

5. A rotary cooking device as recited in claim 1, in which said first pair of elongated members of each hub structure are externally threaded, and said fasteners are nuts received about and threadedly adjustable along said first pair of elongated members.

6. A rotary cooking device as recited in claim 1, in which said hub structures have stub shafts projecting in opposite directions therefrom and in axial alignment with one another for mounting the device to turn about said axis.

7. A rotary cooking device as recited in claim 1, in which each grill includes means forming an elongated guideway slidably receiving one of said first pair of elongated members and one of said second pair of elongated members at axially spaced locations.

8. A rotary cooking device as recited in claim 1, in which said fasteners are ratchet devices engageable in holding relation with any of a series of different teeth formed along said first pair of elongated members.

9. A rotary cooking device as recited in claim 1, in which each grill includes a U-shaped wire forming two axially extending parallel arms spaced laterally apart and interconnected by a return bend portion of the wire, one of said elongated members being slidably received and confined between said arms at said return bend portion of the wire, and another of said elongated members being slidably received and confined between said arms at a location spaced from said return bend portion, said grill having cross-pieces extending between and interconnecting said arms at axially spaced locations.

10. A rotary cooking device as recited in claim 9, in which one of said cross pieces is located near said return bend portion of the wire at a location confining said one elongated member against axial movement therefrom.

* * * * *